United States Patent
Lin et al.

(10) Patent No.: US 7,278,672 B2
(45) Date of Patent: Oct. 9, 2007

(54) MOTOR VEHICLE WITH DIRECTION-LOCKABLE SEAT ASSEMBLY

(75) Inventors: Yung-Shiang Lin, Chia Yi Hsien (TW); Chih-Sheng Chen, Chia Yi (TW)

(73) Assignee: Sunpex Technology Co., Ltd. (TW)

( * ) Notice: Subject to any disclaimer, the term of this patent is extended or adjusted under 35 U.S.C. 154(b) by 175 days.

(21) Appl. No.: 11/259,774

(22) Filed: Oct. 27, 2005

(65) Prior Publication Data

US 2007/0096495 A1    May 3, 2007

(51) Int. Cl.
*B60N 2/02* (2006.01)

(52) U.S. Cl. .................. 296/65.03; 296/63; 297/217.7; 297/188.08

(58) Field of Classification Search ............... 29/63, 29/65.03, 65.05; 297/217.7, 188.01, 188.08
See application file for complete search history.

(56) References Cited

U.S. PATENT DOCUMENTS 5,020,624 A * 6/1991 Nesterick et al. ........... 180/210
6,176,337 B1 * 1/2001 McConnell et al. ......... 180/208

* cited by examiner

*Primary Examiner*—Lori L. Lyjak
(74) *Attorney, Agent, or Firm*—Ostrolenk, Faber, Gerb & Soffen, LLP

(57) ABSTRACT

A direction-lockable seat assembly for a motor vehicle includes an upright seat post that defines a pivot axis, a seat member mounted on top of the seat post such that the seat member is rotatable about the pivot axis, and a direction-locking device that includes a locking plate, a slide guide unit, and a locking pin. The locking plate has a plate body mounted on top of the seat post and formed with a plurality of angularly spaced apart locking grooves. The slide guide unit is mounted on the seat member, and is formed with a slide channel to be aligned with a selected locking groove. The locking pin is movably disposed in the slide channel, and is operable to extend into the selected locking groove so as to arrest rotation of the seat member.

14 Claims, 4 Drawing Sheets

MOTOR VEHICLE WITH DIRECTION-LOCKABLE SEAT ASSEMBLY

BACKGROUND OF THE INVENTION

1. Field of the Invention

The invention relates to a motor vehicle, more particularly to a motor vehicle that is provided with a direction-lockable seat assembly.

2. Description of the Related Art

A motor vehicle for handicapped or invalid passengers is usually provided with a rotatable seat assembly that is rotatable about a vertical axis so as to facilitate movement of the passenger into and out of the vehicle.

Accordingly, there is a need in the art to provide the rotatable seat assembly with a direction-locking function to ensure passenger safety.

SUMMARY OF THE INVENTION

According to one aspect of the invention, a motor vehicle comprises a vehicle frame, and a direction-lockable seat assembly that includes an upright seat post, a seat member, and a direction-locking device. The seat post is mounted on the vehicle frame and defines a pivot axis. The seat member is mounted on top of the seat post such that the seat member is rotatable relative to the seat post about the pivot axis. The direction-locking device includes a locking plate, a slide guide unit, and a locking pin.

The locking plate has a plate body mounted on top of the seat post. The plate body has an outer periphery, and is formed with a plurality of locking grooves that are angularly spaced apart from each other relative to the pivot axis and that extend in radial inward directions from the outer periphery of the plate body toward the pivot axis.

The slide guide unit is mounted on the seat member, and is formed with a slide channel to be aligned with a selected one of the locking grooves.

The locking pin is movably disposed in the slide channel, and is operable to extend into the selected one of the locking grooves so as to arrest rotation of the seat member relative to the seat post.

According to another aspect of the invention, a direction-lockable seat assembly for a motor vehicle comprises an upright seat post that defines a pivot axis, a seat member mounted on top of the seat post such that the seat member is rotatable relative to the seat post about the pivot axis, and a direction-locking device that includes a locking plate, a slide guide unit, and a locking pin.

The locking plate has a plate body mounted on top of the seat post. The plate body has an outer periphery, and is formed with a plurality of locking grooves that are angularly spaced apart from each other relative to the pivot axis and that extend in radial inward directions from the outer periphery of the plate body toward the pivot axis.

The slide guide unit is mounted on the seat member, and is formed with a slide channel to be aligned with a selected one of the locking grooves.

The locking pin is movably disposed in the slide channel, and is operable to extend into the selected one of the locking grooves so as to arrest rotation of the seat member relative to the seat post.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
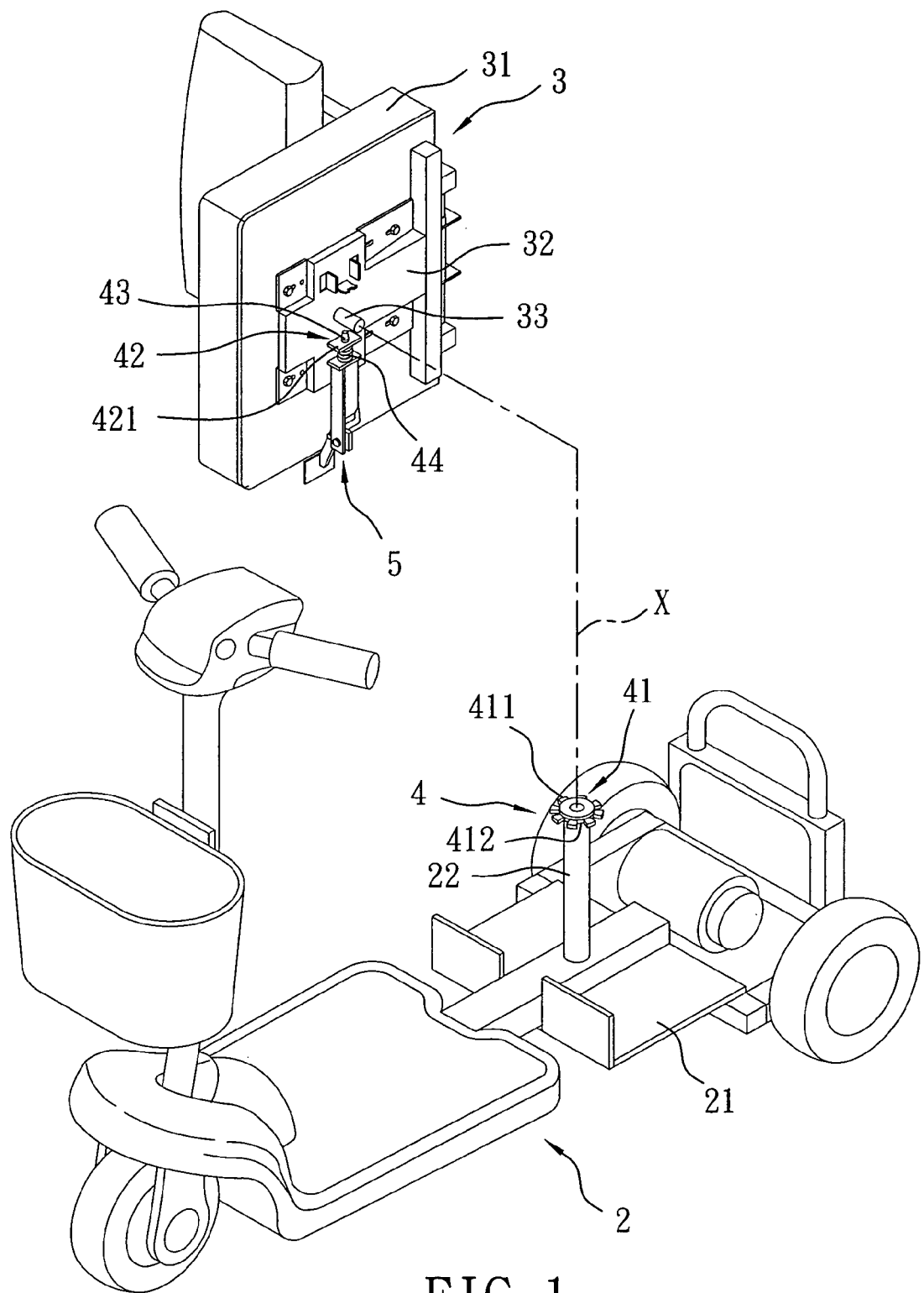
FIG. 1 is an exploded perspective view of the preferred embodiment of a motor vehicle with a direction-lockable seat assembly according to the present invention.
Figure 2:
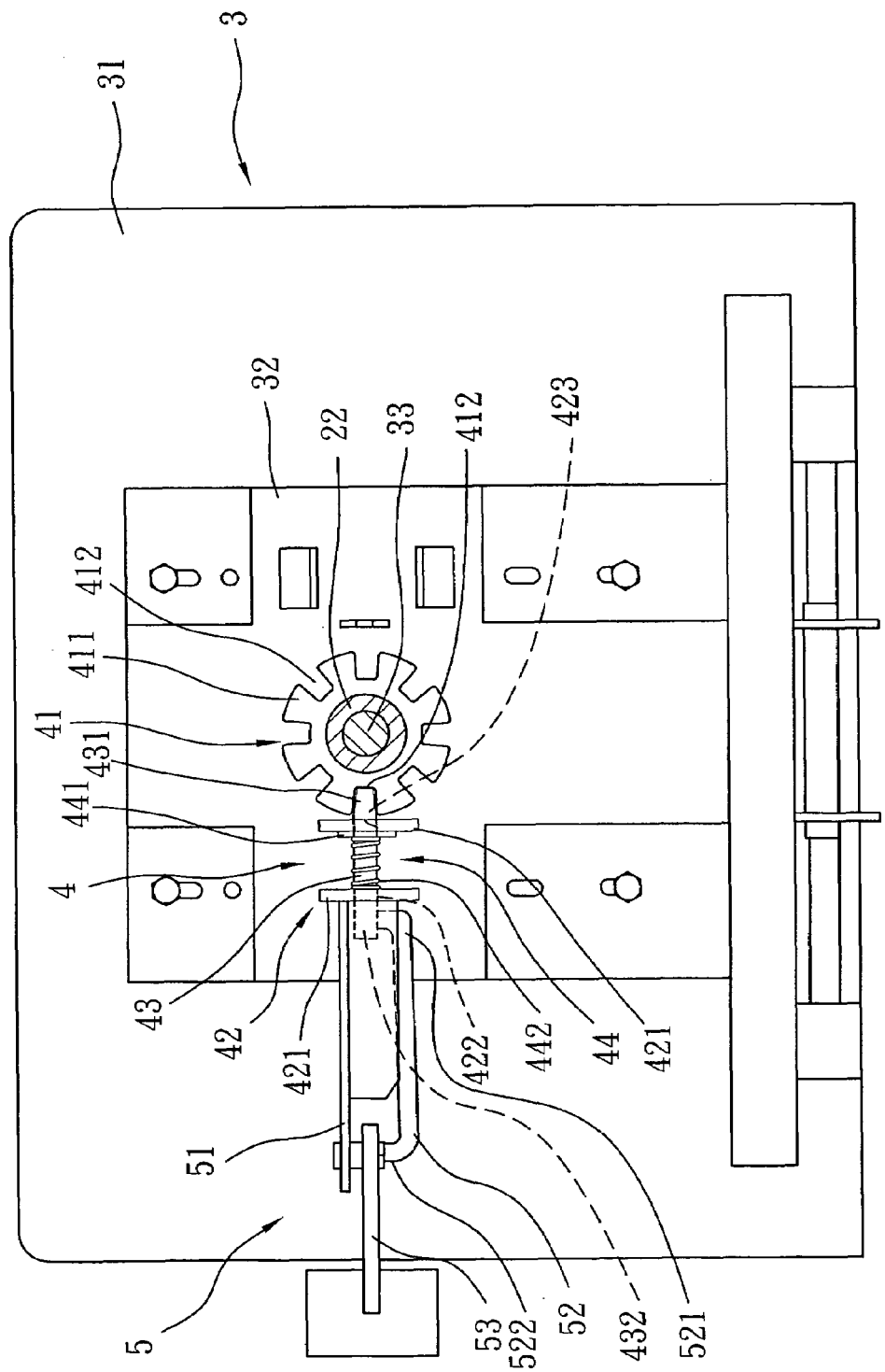
FIG. 2 is a partly sectional, schematic bottom view of the seat assembly of the preferred embodiment.
Figure 3:
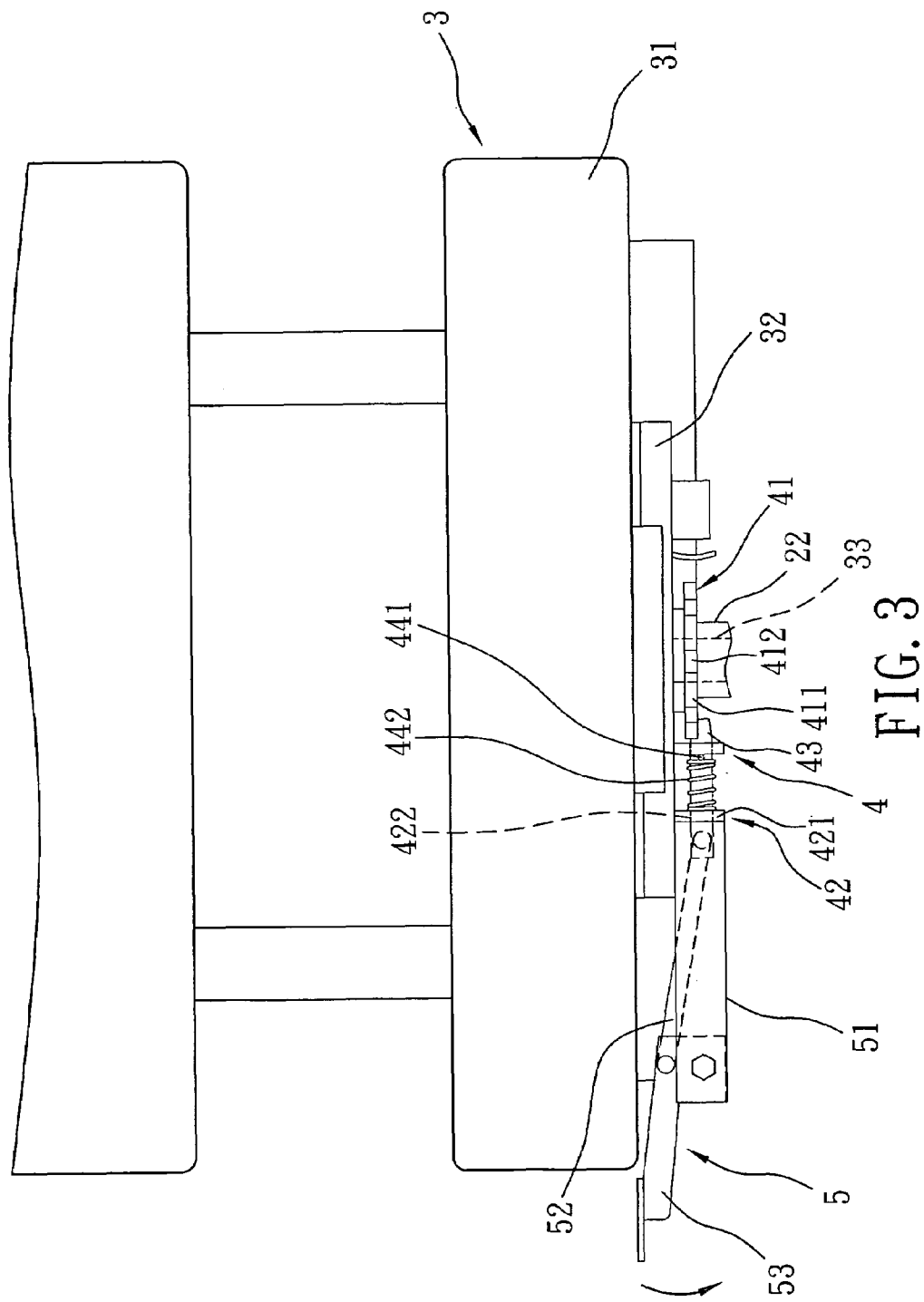
FIG. 3 is a fragmentary schematic front view to illustrate a locked state of the seat assembly.

Referring to FIGS. 1 to 3, the preferred embodiment of a motor vehicle according to the present invention is shown to include a vehicle frame 2, and a direction-lockable seat assembly that includes an upright seat post 22, a seat member 3, and a direction-locking device 4.

The vehicle frame 2 includes a chassis 21. The seat post 22 is mounted on the chassis 21 and defines a pivot axis (X).

The seat member 3 is mounted on top of the seat post 22 such that the seat member 3 is rotatable relative to the seat post 22 about the pivot axis (X). In this embodiment, the seat member 3 includes a seat base 32, a seat cushion 31 mounted on top of the seat base 32, and a pivot stud 33 extending downwardly from a bottom side of the seat base 32 and inserted rotatably into the seat post 22, thereby mounting rotatably the seat member 3 on the seat post 22.

The direction-locking device 4 includes a locking plate 41, a slide guide unit 42, and a locking pin 43.

The locking plate 41 has a plate body 411 mounted on top of the seat post 22. The plate body 411 has an outer periphery, and is formed with a plurality of locking grooves 412 that are angularly spaced apart from each other relative to the pivot axis (X) and that extend in radial inward directions from the outer periphery of the plate body 411 toward the pivot axis (X).

The slide guide unit 42 is mounted on the bottom side of the seat base 32, and is formed with a slide channel 423 to be aligned with a selected one of the locking grooves 412. In this embodiment, the slide guide unit 42 includes a pair of upright guide plates 421 mounted on the bottom side of the seat base 32 and spaced apart from each other. The guide plates 421 are respectively formed with horizontally aligned pin holes 422. The slide channel 423 extends between the pin holes 422 of the guide plates 421. In other embodiments of this invention, the slide guide unit may be in the form of a tubular component that defines the slide channel.

The locking pin 43 is movably disposed in the slide channel 423, and is operable to extend into the selected one of the locking grooves 412 so as to arrest rotation of the seat member 3 relative to the seat post 22. The locking pin 43 has an engaging end part 431 for engaging the selected one of the locking grooves 412, and an operating end part 432 opposite to the engaging end part 431. Preferably, the engaging end part 431 of the locking pin 43 tapers toward the pivot axis (X) to facilitate engagement with the selected one of the locking grooves 412.

Preferably, the direction-locking device 4 further includes an urging unit 44 for urging the locking pin 43 toward the pivot axis (X). In this embodiment, the urging unit 44 includes a force bearing component 441 connected to the locking pin 43 and disposed between the guide plates 421, and a spring 442 sleeved on the locking pin 43 and having a first end that abuts against the force bearing component 441 and a second end that abuts against one of the guide plates 421.

It should be noted herein that the urging unit 44 is optional and may be omitted without disabling functionality of the direction-locking device 4.

Moreover, for operational convenience, the direction-lockable seat assembly of this embodiment further includes a pin operating unit 5 that includes a mounting component 51 mounted on the bottom side of the seat base 32, a connecting rod 52 having a first rod end 521 connected pivotally to the operating end part 432 of the locking pin 43, and a second rod end 522 opposite to the first rod end 521, and a hand-operated lever 53 that is connected pivotally to the mounting component 51 and to the second rod end 522 of the connecting rod 52 and that is manually operable for enabling the connecting rod 52 to pull the locking pin 43 away from the locking plate 41. The pivot connection between the hand-operated lever 53 and the connecting rod 52 is disposed above the pivot connection between the hand-operated lever 53 and the mounting component 51.

Figure 4:
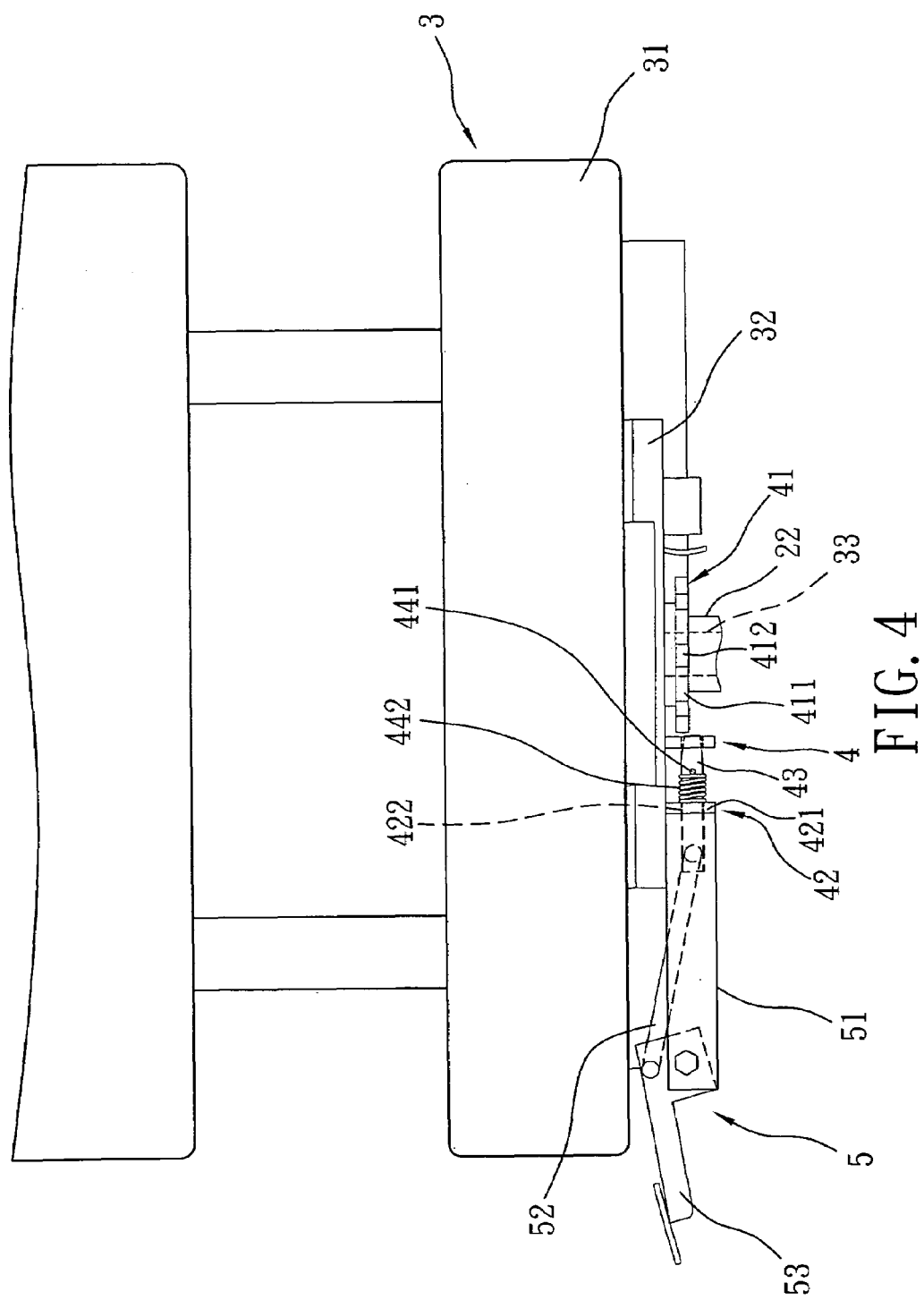
FIG. 4 is a view similar to FIG. 3, but illustrating an unlocked state of the seat assembly.

To change the seat assembly from a locked state shown in FIG. 3 to an unlocked state shown in FIG. 4, it is only necessary to press the hand-operated lever 53 downward for enabling the connecting rod 52 to pull the locking pin 43 away from the locking plate 41. The seat member 3 may be rotated relative to the seat post 22 at this time. To lock the seat member 3 at the desired direction, the hand-operated lever 53 is released, and the urging unit 44 moves the locking pin 43 to extend once again into a selected one of the locking grooves 412 so as to arrest further rotation of the seat member 3 relative to the seat post 22.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A motor vehicle comprising:
   a vehicle frame; and
   a direction-lockable seat assembly including
      an upright seat post mounted on said vehicle frame and defining a pivot axis,
      a seat member mounted on top of said seat post such that said seat member is rotatable relative to said seat post about the pivot axis, and
      a direction-locking device including
         a locking plate having a plate body mounted on top of said seat post, said plate body having an outer periphery and being formed with a plurality of locking grooves that are angularly spaced apart from each other relative to the pivot axis and that extend in radial inward directions from said outer periphery of said plate body toward the pivot axis,
         a slide guide unit mounted on said seat member and formed with a slide channel to be aligned with a selected one of said locking grooves, and
         a locking pin movably disposed in said slide channel and operable to extend into the selected one of said locking grooves so as to arrest rotation of said seat member relative to said seat post.

2. The motor vehicle as claimed in claim 1, wherein said seat member includes a seat base having said slide guide unit mounted thereon, a seat cushion mounted on top of said seat base, and a pivot stud extending downwardly from said seat base and inserted rotatably into said seat post.

3. The motor vehicle as claimed in claim 1, wherein said locking pin has an engaging end part that tapers toward the pivot axis for engaging the selected one of said locking grooves.

4. The motor vehicle as claimed in claim 1, wherein said direction-locking device further includes an urging unit for urging said locking pin toward the pivot axis.

5. The motor vehicle as claimed in claim 4, wherein said slide guide unit includes a pair of upright guide plates mounted on said seat member and spaced apart from each other, said guide plates being respectively formed with horizontally aligned pin holes, said slide channel extending between said pin holes of said guide plates.

6. The motor vehicle as claimed in claim 5, wherein said urging unit includes a force bearing component connected to said locking pin and disposed between said guide plates, and a spring sleeved on said locking pin and having a first end that abuts against said force bearing component and a second end that abuts against one of said guide plates.

7. The motor vehicle as claimed in claim 1, wherein said locking pin has an engaging end part for engaging the selected one of said locking grooves, and an operating end part opposite to said engaging end part, said direction-lockable seat assembly further including a pin operating unit that includes:
   a mounting component mounted on said seat member;
   a connecting rod having a first rod end connected pivotally to said operating end part of said locking pin, and a second rod end opposite to said first rod end; and
   a hand-operated lever connected pivotally to said mounting component and to said second rod end of said connecting rod, said hand-operated lever being manually operable for enabling said connecting rod to pull said locking pin away from said locking plate.

8. A direction-lockable seat assembly for a motor vehicle, said direction-lockable seat assembly comprising:
   an upright seat post defining a pivot axis;
   a seat member mounted on top of said seat post such that said seat member is rotatable relative to said seat post about the pivot axis; and
   a direction-locking device including
      a locking plate having a plate body mounted on top of said seat post, said plate body having an outer periphery and being formed with a plurality of locking grooves that are angularly spaced apart from each other relative to the pivot axis and that extend in radial inward directions from said outer periphery of said plate body toward the pivot axis,
      a slide guide unit mounted on said seat member and formed with a slide channel to be aligned with a selected one of said locking grooves, and
      a locking pin movably disposed in said slide channel and operable to extend into the selected one of said locking grooves so as to arrest rotation of said seat member relative to said seat post.

9. The direction-lockable seat assembly as claimed in claim 8, wherein said seat member includes a seat base having said slide guide unit mounted thereon, a seat cushion mounted on top of said seat base, and a pivot stud extending downwardly from said seat base and inserted rotatably into said seat post.

10. The direction-lockable seat assembly as claimed in claim 8, wherein said locking pin has an engaging end part that tapers toward the pivot axis for engaging the selected one of said locking grooves.

11. The direction-lockable seat assembly as claimed in claim 8, wherein said direction-locking device further includes an urging unit for urging said locking pin toward the pivot axis.

12. The direction-lockable seat assembly as claimed in claim 11, wherein said slide guide unit includes a pair of upright guide plates mounted on said seat member and spaced apart from each other, said guide plates being respectively formed with horizontally aligned pin holes, said slide channel extending between said pin holes of said guide plates.

13. The direction-lockable seat assembly as claimed in claim 12, wherein said urging unit includes a force bearing component connected to said locking pin and disposed between said guide plates, and a spring sleeved on said locking pin and having a first end that abuts against said force bearing component and a second end that abuts against one of said guide plates.

14. The direction-lockable seat assembly as claimed in claim 8, wherein said locking pin has an engaging end part for engaging the selected one of said locking grooves, and an operating end part opposite to said engaging end part, said direction-lockable seat assembly further comprising a pin operating unit that includes:

a mounting component mounted on said seat member;

a connecting rod having a first rod end connected pivotally to said operating end part of said locking pin, and a second rod end opposite to said first rod end; and a hand-operated lever connected pivotally to said mounting component and to said second rod end of said connecting rod, said hand-operated lever being manually operable for enabling said connecting rod to pull said locking pin away from said locking plate.

* * * * *